US012797171B2

(12) United States Patent
Donnet et al.

(10) Patent No.: US 12,797,171 B2
(45) Date of Patent: Nov. 17, 2026

(54) SUCTION DEVICE FOR SUCTIONING MATERIAL DURING A DENTAL TREATMENT, ATTACHMENT FOR SUCH A SUCTION DEVICE AND A METHOD FOR SUCTIONING MATERIAL DURING A DENTAL TREATMENT

(71) Applicant: FERTON HOLDING S.A., Delémont (CH)

(72) Inventors: Marcel Donnet, St. Jean de Gonville (FR); Vincent Renaud, Vésenaz (CH)

(73) Assignee: FERTON HOLDING S.A., Delémont (CH)

( * ) Notice: Subject to any disclaimer, the term of this patent is extended or adjusted under 35 U.S.C. 154(b) by 202 days.

(21) Appl. No.: 18/278,044

(22) PCT Filed: Feb. 21, 2022

(86) PCT No.: PCT/EP2022/054271
§ 371 (c)(1),
(2) Date: Aug. 21, 2023

(87) PCT Pub. No.: WO2022/175530
PCT Pub. Date: Aug. 25, 2022

(65) Prior Publication Data

US 2024/0050210 A1 Feb. 15, 2024

(30) Foreign Application Priority Data

Feb. 22, 2021 (EP) .................................... 21158528
May 12, 2021 (EP) .................................... 21173573

(51) Int. Cl.
*A61C 17/08* (2006.01)

(52) U.S. Cl.
CPC .................................. *A61C 17/08* (2019.05)

(58) Field of Classification Search
CPC ....... A61C 17/08; A61C 17/06; A61C 17/088; A61C 17/096; A61C 17/10; A61C 17/04
See application file for complete search history.

(56) References Cited

U.S. PATENT DOCUMENTS 2,637,107 A 5/1953 Daigle
4,058,896 A * 11/1977 Moore .................. A61C 17/08 433/91

(Continued)

FOREIGN PATENT DOCUMENTS

CA 3081887 A1 12/2020
DE 202009003818 U1 6/2009

(Continued)

OTHER PUBLICATIONS

International Search Report for corresponding application PCT/EP2022054271 filed Feb. 21, 2022; Mail date May 31, 2022.

(Continued)

*Primary Examiner* — Ralph A Lewis
(74) *Attorney, Agent, or Firm* — CANTOR COLBURN LLP

(57) ABSTRACT

A suction device for suctioning material during a dental treatment, the suction device including a handpiece having a suction aperture to allow passage of suctioned material, an attachment for splatter protection designed for being mounted on the handpiece, the attachment including a mounting section for an exchangeable or a permanent mounting of the attachment to the handpiece, a suction opening for the passage of suctioned material through the suction opening and the suction aperture when the attachment is mounted on the handpiece, and at least a side wall extending from the suction opening and forming a working channel designed to surround a molar, partially or at least two sides of the molar and, in particular, simultaneously to (Continued)

host a dental tool, the channel having at least one introduction section for introduction of a dental tool into the working channel.

12 Claims, 8 Drawing Sheets

(56) References Cited

U.S. PATENT DOCUMENTS

| | | | | | |
|---|---|---|---|---|---|
| D287,402 | S * | 12/1986 | Orsing | 433/91 |
| 4,865,021 | A | 9/1989 | Siderman | |
| 5,165,891 | A | 11/1992 | Young et al. | |
| 5,407,353 | A * | 4/1995 | Clementz | A61C 17/08 433/136 |
| 5,490,780 | A | 2/1996 | Riewenherm | |
| 2017/0196542 | A1* | 7/2017 | Spiteri | A61J 19/02 |
| 2019/0262109 | A1 | 8/2019 | Gharib et al. | |
| 2019/0274800 | A1* | 9/2019 | Sidhu | A61C 17/08 |
| 2020/0038156 | A1* | 2/2020 | Clasen | A61C 17/08 |
| 2024/0050210 | A1* | 2/2024 | Donnet | A61C 17/08 |

FOREIGN PATENT DOCUMENTS

| | | | |
|---|---|---|---|
| DE | 202010009610 | U1 | 10/2011 |
| EP | 3184076 | B1 | 11/2019 |
| JP | H06504465 | A | 5/1994 |
| JP | 2001231796 | A | 8/2001 |
| JP | 2015128500 | A | 7/2015 |
| RU | 2612505 | C2 | 3/2017 |
| WO | 9212686 | A1 | 8/1992 |
| WO | 0028916 | A1 | 5/2000 |
| WO | 2015179785 | A1 | 11/2015 |

OTHER PUBLICATIONS

International Preliminary Report on Patentability for corresponding application PCT/EP2022/054271 filed Feb. 21, 2022; Mail date Aug. 22, 2023.

* cited by examiner

SUCTION DEVICE FOR SUCTIONING MATERIAL DURING A DENTAL TREATMENT, ATTACHMENT FOR SUCH A SUCTION DEVICE AND A METHOD FOR SUCTIONING MATERIAL DURING A DENTAL TREATMENT

TECHNICAL FIELD

The present disclosure concerns a suction device for suctioning material, such as splatter (water/saliva projection/bacteria) and aerosol (small contamination in air), during a dental treatment, an attachment for such a suction device and a method for suctioning material during a dental treatment.

BACKGROUND

Suctioning material during a dental treatment is well-known from the prior art. Typically, materials, such as biofilm, saliva, living material debris and other projections, are removed by aspirating systems, which are placed inside the mouth of the patient during the treatment. In particular, the present disclosure concerns a suction device for suctioning material during the dental treatment, which is used together with a scaler or a powder jet device. The use of such a tool, namely of a scaler or a powder jet device, creates specific challenges for an effective suctioning and splatter protection, since the interaction of the tool and the teeth in the mouth region of the patient creates a large amount of splatter, which actually could exit the mouth region.

The prior art knows, for example, the subject matter of EP 3 145 442 B1, concerning an aspirating system, which, during the operation, is inserted in the mouth of a patient and extends across the whole inside of the mouth. In particular, the aspirating device of EP 3 145 442 B1 includes two wall sections having aspirating openings being arranged inside the side wall sections, the side wall sections being located opposite to each other. A space between the walls being opposite to each other is closed during the aspirating operation.

DE 20 2009 003 818 U1 concerns a funnel like attachment, which can be attached to an aspirating unit. U.S. Pat. No. 4,865,021 A1 concerns a device, which comprises both a handpiece for providing a fluid, which exits the supply line and aspiration lines, which remove the fluid. The supply and aspiration lines are fixed to a common splatter protection such that the supply line cannot move relatively to the aspiration line. As a result, it is not possible to modify the relative position between the openings of the supply line, i.e. the handpiece for treating the teeth, on the one hand and the aspiration line on the other hand.

The subject matter of EP 1 131 015 A1 concerns a pot-like attachment to a suction device, which mainly completely fills a mouth of a patient. Document WO 2014 209 504 concerns a dental handpiece having a tongue retractor. Further, the prior art knows the subject matter of EP 3 360 508 A1, which concerns a handpiece, which ejects a fluid as well as an arrangement of walls for forming a splatter protection.

BRIEF SUMMARY

Considering the above, the present disclosure provides a suction device for suctioning material during a dental treatment, which can reduce effectively the amount of splatter, which exits otherwise the mouth region, in particular in such cases, in which the suction device is used together with another independent tool, preferably a scaler and/or powderjet. In particular, the suction device for suctioning should be adapted to the specific characteristics of the tool, being used together with a suction device for suctioning material.

According to a first aspect of the present disclosure a suction device for suctioning material during a dental treatment is provided, the suction device comprising a handpiece having a suction aperture to allow passage of suctioned material, the suction device comprising further an attachment for splatter protection designed for being mounted on the handpiece, the attachment comprising:

- a mounting section for an exchangeable or a permanent mounting of the attachment to the handpiece,
- a suction opening for the passage of suctioned material through the suction opening and the suction aperture when the attachment is mounted on the handpiece, and
- at least a side wall extending from the suction opening and forming a working channel designed to surround a molar partially or at least two sides of the molar, and, in particular, simultaneously to host a dental tool, the channel having at least one introduction section for introduction of a dental tool into the working channel.

Contrary to the state of the art, it is in an advantageous manner possible to form a working channel for reducing the volume above a teeth, wherein suction is applied, such that the sucking efficiency can be increased. In particular, it is possible to reduce the volume, experiencing a high suction force, and thus an effective suction can be established. As a consequence, it is possible to cover the molars in a dome like manner by arranging the attachment above the teeth, in particular above the treatment zone. Preferably, the suction device is formed like a tooth brush for best accessibility to all mouth areas. Besides creating a high suction volume around the treatment zone, it is also possible to avoid a reduction of visibility of the treatment zone. The arrangement above the treatment zone and/or the tool is even possible in case of the molars. The covering in the dome like manner supports a splatter protection by the inner sides of the side wall, which can be arranged very close to the teeth for increasing the efficiency of splatter protection. Especially, the geometry of the attachment allows even placing an additional tool, such as scaler or a powder jet device between the attachment and the treatment zone or the tooth. Particularly, “at least partially” surrounding the molar means that at least two sides. preferably three sides, of the molar can be covered.

The working channel is configured such that the working channel is suitable to receive a row of teeth. In particular, the working channel is configured to surround several teeth at least at two sides, preferably at three side. Preferably, a length of the working channel is larger than a width of the working channel, preferably more than 1.5 times larger, more preferably more than 2.5 times larger and most preferably 3.5 times larger than a width of the working channel.

Preferably, the working channel is formed by two wall sections being arranged opposite to each other, the wall sections preferably having the same or similar length, measured in a direction perpendicular to the suction opening. The term “similar length” includes difference in length of about 10% with respect to a maximum length. The length is measured in a direction, being perpendicular to the suction opening, in particular perpendicular to the opening suction at the mounting section of the attachment. Especially, the length is measured starting from the mounting section. If the length is modulated along the circumferential direction of the side wall, the maximum length preferably defines the length of the side wall or the side wall section. Furthermore, the distal end of the suction device is configured to be arranged inside a mouth of a patient, in particular a human patient, and/or can be placed above the molar to surround it.

In particular, it is provided that the side wall surrounds the suction opening, in particular even in a region outside of the mounting section. The wall section can be arched along the longitudinal direction of the handpiece and wall sections are preferably arranged in a mirror symmetrical manner with respect to the longitudinal direction of the handpiece. Preferably, the mounting section forms the interface between the handpiece, in particular the suction aperture, and the attachment.

Preferably, the attachment comprises

- side wall sections, being arranged opposite to each other and extending from the suction opening at the mounting section over a length, and
- further side wall sections, the further side wall sections being arranged opposite to each other and extending from the suction opening over a further length, wherein a ratio between a mean of the minimum further lengths to a maximum length is between 0 and 0.8, preferably between 0 and 0.4 and most preferably between 0 and 0.2. Especially, the further side wall sections/side wall sections distinguish from each other with respect to the minimum further length/maximum length and therefore the mean of the minimum further length/maximum length is considered. Furthermore, it is conceivable that the side wall section/further side wall sections are modulated with respect to their length such that the maximum length and the minimum further length are considered by determining the ratio between the length of the side wall section and the further side wall section. Preferably, it is provided that a difference between the minimum further length/maximum length is smaller than 25%, preferably smaller than 15% and most preferably smaller than 10% of the mean of the minimum further lengths/mean of the maximum lengths. The side wall sections and the further side wall section are respectively arranged opposite to each other, the suction opening being located respectively between the wall sections and/or further wall sections. Preferably, the side wall sections and the further side wall sections, in particular their general course, are mainly orientated about 90° to each other. Furthermore, it is preferably provided that the further wall section, in particular each wall section, has a single minimum further length and particularly the wall section, in particular each wall section, has a single maximum length.

In particular, the working channel extends along a direction being mainly parallel to a longitudinal direction of the handpiece or along a direction being mainly slanted about up to 45°, preferably up to 30° and most preferably up to 15° relative to the longitudinal direction of the handpiece. As a consequence, it is possible to form a channel, which mainly extends parallel to a row of molar or can adapted to such an arrangement. It is also conceivable that the attachment can be rotated about an axis extending mainly perpendicular to the suction opening for adapting the orientation of the channel by rotating the attachment. Preferably, it is provided that such a rotation is limited such that only angles up to 45° can be adjusted. It is also thinkable that the orientation can be adapted stepwise between defined angles of rotation of the attachment, relative to the longitudinal direction of the handpiece. The direction of the working channel is mainly determined by a longitudinal direction of the side wall section having maximum length or the parallel wall sections having maximum lengths.

Preferably, it is provided according to the disclosure that the extension of the side wall of the attachment, in particular its maximum length, is small compared to the extension or size of the suction opening. Preferably, the maximum length of the side wall is smaller than the maximum extension of the suction opening. In other words: The attachment provides a comparable large aspiration opening, while the side wall protruding from the suction opening is small, in particular measured from the suction opening at the mounting section. It turned out that this geometry supports forming a suction device for suctioning material having a comparable thin distal end section, which supports the simultaneous use of the suction device together with another tool, especially a powder jet device and/or scaler. Especially, the flat configuration of the attachment allows the use without completely filling the mouth of a patient and further allows the flexibility to properly arrange the suction device for effectively aspirating material above a treatment zone, in which splatters are typically generated. Preferably, it is possible to arrange the attachment and the aspirating suction device above an additional treatment tool, such as a scaler or powder jet device, and the treatment zone in order to cover the treatment zone and/or the handpiece in a dome like manner.

Preferably, it is provided that the suction opening and/or the suction aperture is non-circular. For example, the suction opening and/or the suction has an oval or elliptic cross section. As a result, a comparable big cross section for the suction opening is provided, in particular compared to a circular cross section for a handpiece having the same diameter. It is also conceivable that the suction opening and/or the suction aperture has a trapezoidal like, a rectangular or polygon cross section. Further, the side wall is formed by one side wall section or several side wall sections, which preferably merge into each other, for forming a closed circumferential side wall, which surrounds the opening. It is also conceivable that several wall sections are located such that they are spaced to each other for forming an interrupted side wall.

Preferably, the size of the suction opening is defined by a first extension and a second extension in case of a non-circular suction opening. The first extension and the second extension represent each a maximum length in two direction, being perpendicular to each other in a plane of the suction opening. For example, the first and second extension of the suction aperture/suction opening correspond to the dimensions of the small and big axis of an ellipse in case of an elliptic cross section In case of a circular cross section, the first and the second extension have the same size and the size of the suction opening is given by a single value. Preferably, the maximum length of the side wall is smaller than the first extension, the first extension being larger than the second extension. Preferably, it is provided that 1.5 times or even 2 times the maximum length of the side wall is smaller than the first extension, the first extension being larger than the second extension.

Preferably, it is provided that along a circumferential direction of the suction opening a length of the side wall is modulated. As a consequence, it is possible to adapt the lengths of the side wall sections to the typical arrangement of teeth inside the mouth of the patient. Especially, the side wall sections, having a maximum length, mainly extend parallel to the arrangement of the teeth and further side wall sections, having a minimum length, are located typically above the teeth during the treatment, especially during treating molars. Thus, it is possible to effectively cover the treatment zone by the attachment. Especially, the configuration of the modulated lengths is adapted such that the attachment forms a wave like design and/or includes at least one arched section. Thus, it is further possible for the attachment to provide a dome like structure during treatment.

Preferably, it is provided that the attachment includes an interruption, in particular a slit or a hole, preferably in one of the side wall sections having a maximum length, in order to suppress a possible suction to the cheek, which would otherwise occur. Furthermore, it is provided, that the attachment is made from a flexible and/or soft material. For example, the material has a value of 20 to 80 shore. Thus, it is possible to contact the tooth without a danger of hurting and/or damaging the tooth. Especially, it is possible to deform the side wall, in particular the side wall section, in particular when teeth are treated being no molar. As a result, it is possible to adapt the size of the suction volume in front of the treatment zone depending on the type of tooth and its location inside the mouth. Further, in case of a contact with the inside of the mouth of the patient a more comfortable contact is established. For example, the attachment is made from an elastic material, which can be deformed. This supports the mounting process, when the attachment is pulled over a collar section at the suction aperture of the handpiece.

Preferably, it is provided that the attachment is designed and configured for a single use such that after using the attachment and removing it, it can be replaced by a new attachment. Alternatively, the attachment is configured for being reused. In this case the attachment is made from a specific material, which allows sterilization or the contact with a sterilization means. In this case, it is reasonable to remove the attachment from the handpiece in order to sterilize it and reuse it for another patient.

Preferably, the attachment is made from a transparent material. Using a transparent material allows the operator to view on an additional tool, in particular if the additional tool, such as the scaler or the powder jet device, is arranged between the suction device for suctioning material and the tooth, in particular below or next to the attachment. This simplifies the handling of the tool, being used simultaneously with the suction device for suctioning material.

Preferably, the maximum length of the side wall is between 3 mm and 20 mm, preferably between 8 mm and 14 mm and most preferably about 12 mm.

Preferably, the suction aperture extends in a plane, which is slanted relative to a reference plane being perpendicular to the longitudinal direction of the handpiece, preferably about a first angle between 70° and 90°, more preferably between 75° and 85° and most preferably between 75° and 80°. As a result, it is possible to realize a comparably large cross section for the suction aperture. Thus, a cross section is formed at the distal end section, being greater than a circular cross section at a front end of a handpiece having the same diameter.

Preferably, the handpiece has a distal end section, including the suction aperture and the distal end section, the distal end section being slanted relative to the longitudinal direction, preferably by a second angle between 1° and 40°, more preferably between 1° and 25° and most preferably between 1° and 20°. As a result of such a slanted arrangement of the distal end section another tool can be easily placed in the treatment section and the handling of the suction device for suctioning material is further simplified during the dental treatment.

Preferably, the extension of the suction aperture and/or suction opening is between 10 mm and 50 mm, preferably between 15 mm and 50 mm and most preferably between 20 mm and 40 mm. In case of a non-circular cross section, the first extension has a value between 10 mm and 50 mm, preferably between 15 mm and 50 mm and most preferably between 20 mm and 40 mm, for example about 31 mm, while the second extension has a value between 10 mm and 40 mm, preferably between 15 mm and 35 mm and most preferably between 20 and 30 mm, for example about 23 mm.

Preferably, it is provided that a thickness in the distal end section, including the suction aperture, is less than 25 mm, preferably less than 20 mm an most preferably about 18 mm, measured along the longitudinal direction. As a result, it is possible to provide a very flat distal end section, which does not completely fill the mouth of the patient during the treatment and allows simply re-arrangement and orientating the suction device for optimizing the protection for splatters exiting the mouth region.

Preferably, it is provided that the attachment is mounted to the handpiece by a snap connection or by over-molding. For example, it is provided that for the snap connection the attachment is made from material, being much more flexible and elastic compared to the material of the handpiece such that the attachment can be pulled on the distal end section, in particular to a collar like section, which surrounds the suction aperture of the handpiece. Preferably, it is provided that the attachment and the distal end section of the handpiece realize a form fitting and/or force fitting connection along a direction, being perpendicular to the cross section or plane of the suction aperture and the suction opening. In case of an over-molding a permanent connection is established in simple and rigid manner.

Preferably, the suction opening of the attachment is different from the suction aperture of the handpiece regarding its size and/or position. It turned out that, by modifying the sizes of suction aperture and suction opening with respect to each other, it is possible to optimize the suction behavior of the suction device. In particular, it is possible to create a much more homogenous suction effect from a proximal end of the attachment to a distal end of the attachment of the suction device, i. e. along the extension of the attachment following the longitudinal direction. This actually allows an optimized suction even in regions at the bottom of the mouth (in the region of the last molar), i.e. at the distal end of the attachment. Preferably, a first cross section of the suction aperture of the handpiece is smaller than a second cross section of the suction opening of the attachment. In particular, the attachment and/or the handpiece includes an element, particularly a collar or sheet like element, covering the suction aperture and/or suction opening for creating the difference in size and/or position of the suction aperture and suction opening. It is preferably provided that the tube of the handpiece extends at least partially into the region of the suction opening of the attachment for covering at least a part of the suction opening of the attachment. Thus, it is possible to create a suction opening being different in size and/or position, compared to the suction aperture of the handpiece. Furthermore, it is preferably provided that a first center of the first cross section of the suction aperture is shifted with respect to a second center of the suction opening of the attachment. Preferably, the first center and the second center are shifted to each other along a direction, being parallel to the longitudinal direction of the handpiece.

Preferably, the suction aperture is located closer to the distal end of the suction device/attachment compared to the second center of the suction opening.

It is also conceivable that the first center and the second center are offset to each other along a direction being perpendicular to the longitudinal direction. Furthermore, it is conceivable that an additional element is inserted into the suction device for creating a smaller suction aperture, compared to the section opening. For example, it is conceivable that a wall is arranged between handpiece and attachment for creating the preferred sizes and/or positions of suction opening and suction aperture.

Preferably, the suction device includes a mirror element, being preferably arranged at the suction device on a side being opposite to the suction opening. The mirror element allows, for example, checking the treatment zone directly after stopping suction. For instance, the operator can just turn around the suction device, for imaging the regions, which cannot easily seen from the perspective of the operator. The mirror is arranged preferably such that its reflecting side is at the outside of the suction device facing away from the suction opening. The mirror element can be fixed onto the suction device, for example, by creating an appropriate cavity and/or by gluing, clipping press-fitting or over-molding the mirror-element in a desired position, in particular inside the cavity. Particularly, the mirror element is arranged on a back of the handpiece.

Another aspect of the present disclosure is an attachment for a suction device according to the present disclosure. All benefits and specifics, being discussed in context of the suction device, apply for the attachment analogously and vice versa.

Another aspect of the present disclosure is a method for suctioning material during a dental treatment by using a suction device according to the present disclosure, wherein the treatment zone is covered by the working channel and preferably a further tool is located at least partially between the suction device for suctioning material and the treatment zone. All benefits and specifics, being discussed in context of the suction device and the attachment, apply for the method analogously and vice versa.

Wherever not already described explicitly, individual embodiments or their individual aspects and features can be combined or exchanged with one another without limiting or widening the scope of the described disclosure, whenever such a combination or exchange is meaningful and in the sense of this disclosure. Advantages which are described with respect to one embodiment of the present disclosure are, wherever applicable, also advantageous of other embodiments of the present disclosure.

DETAILED DESCRIPTION

Figure 1:
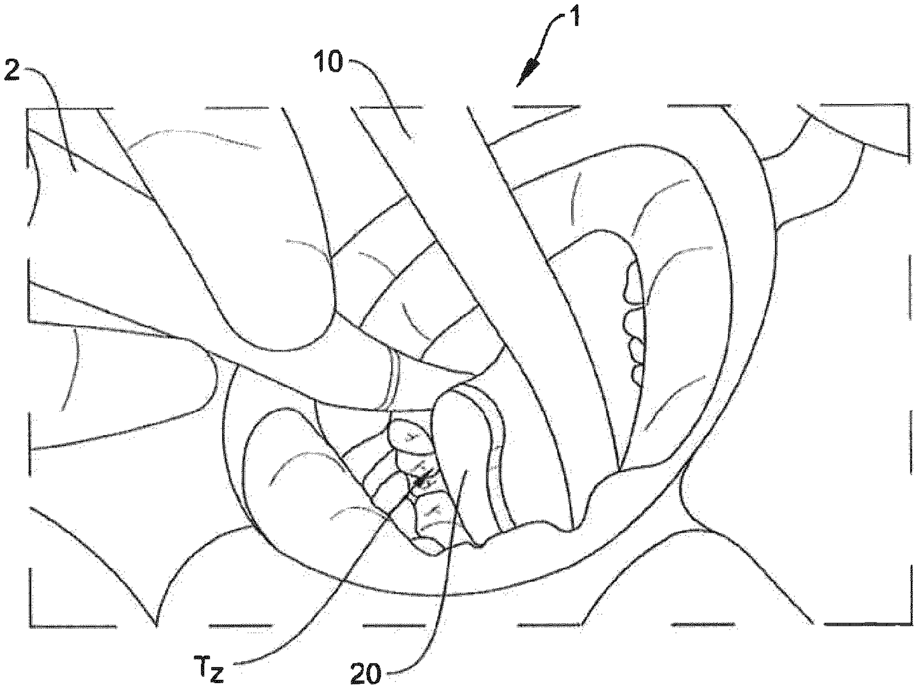
FIG. 1 schematically illustrates a suction device for suctioning material during a dental treatment according to a preferred embodiment of the present disclosure during use FIG. 2 schematically illustrates the suction device of FIG. 1 in two side views FIG. 3 schematically illustrates the suction device of FIG. 1 in another side view, FIG. 4 schematically illustrates the suction device of FIG. 1 in a perspective view

In FIG. 1 a suction device 1 for suctioning material during a dental treatment according to preferred embodiment of the present disclosure is shown during its use. In particular, such a suction device 1 for suctioning material is intended to remove material during the treatment, the material being for example splatters and/or aerosols, which would otherwise collected or accumulated in a treatment zone TZ and could hinder the operator to properly treat a target in the treatment zone TZ, i.e. a surface area of a tooth.

In particular, the suction device 1 for suctioning material during the dental treatment is intended and configured such that it can be used simultaneously with an independent tool 2, which during operation treats the tooth. The term "independent" means that the suction device 1 for suctioning material during the dental treatment on the one hand and the tool 2 on the other hand can be moved relative to each other and they are not fixed to each other in a rigid manner. Preferably, the tool 2 is a scaler or a powderjet device for removing calculus and/or biofilms from the surfaces of the tooth. Using such a tool 2 is usually accompanied by an intense splatter formation, which actually can even exit the mouth region of a patient.

For reducing the amount of splatters, which exit the mouth region during the operation, an attachment 20 is arranged at a distal end section 11 of the suction device 1 for suctioning material during dental treatment. In particular, the attachment 20 is configured such that it can be used together with the tool 2, preferably a scaler and a powder jet device, in particular a nozzle head of the powder jet device. As a result, suction device 1 and tool 2 can be placed in a mouth of the patient and orientated simultaneously. Especially, it is possible to place the attachment 20 above the tool 2 during the treatment in order to cover the treatment zone TZ and/or the tool 2 in a dome like manner.

Figure 2:
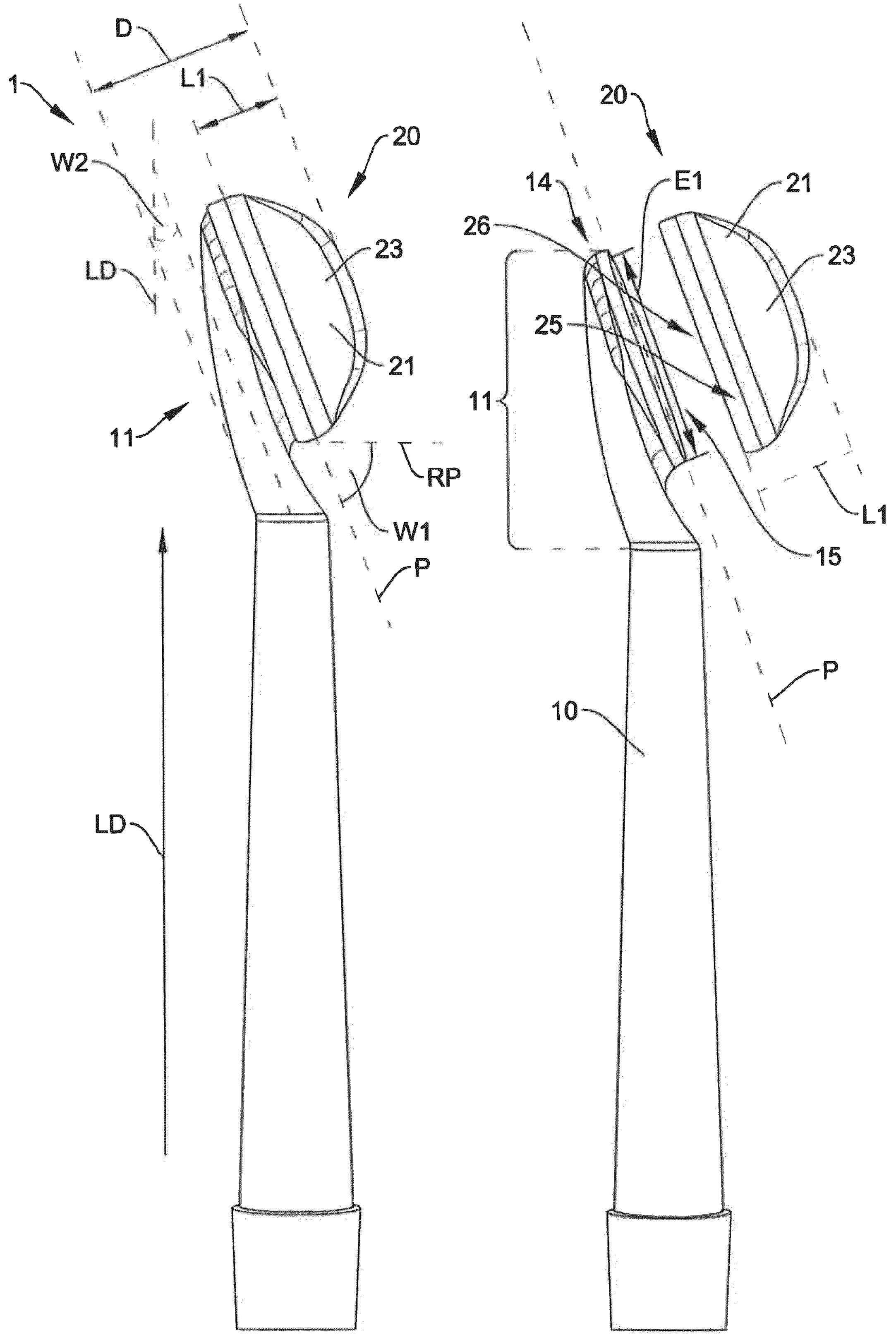

In FIG. 2 the suction device 1 for suctioning material during the dental treatment of FIG. 1 is illustrated schematically in two side views. The suction device 1 for suctioning material during the dental treatment comprises a handpiece 10, extending along a longitudinal direction LD, and an attachment 20, being preferably removable attached to the handpiece 10. In particular, the handpiece 10 comprises a suction aperture 15, being in particular located at a distal end section 11 of the handpiece 10. Especially, it is provided that the suction aperture 15 extends in a plane P, which is slanted relative to a reference plane RP, which extends perpendicular to the longitudinal direction LD of the handpiece 10, preferably about a first angle W1 between 70° and 90°, more preferably between 75° and 85° and most preferably between 75° and 80°. As a result, the suction aperture 15 has a non-circular cross section, preferably an oval cross section, having a first extension E1 and/or a second extension E2, the first extension E1 and the second extension E2 corresponding to the respective maximum extensions of the suction aperture 15 along two direction, being perpendicular to each other in the plane P, being slanted relative to the reference plane RP. Preferably, the suction opening 26 is arranged at least partially in front of the suction aperture 15 and/or the suction opening 26 is orientated in a slanted manner with respect to the suction aperture 15.

As a result, the suction aperture 15 represents a comparable large dimensioned opening, which allows collecting and removing plenty of material during the aspiration process. Furthermore, it is provided the distal end section 11 of the handpiece 10 is slanted relative to the longitudinal direction LD about a second angle W2 between 1° and 40°, more preferably between 1° and 25°, and most preferably between 1° and 20°.

In the suction device 1, being illustrated in the top illustration of FIG. 2, the attachment 20 is mounted to the handpiece 10, in particular to the suction aperture 15 of the handpiece 10. In the lower illustration of FIG. 2 the attachment 20 is spaced from the suction aperture 15 of the handpiece 10.

In particular, it is provided that the attachment 20 has a suction opening 26, which is passed by the material being aspirated during its use. Especially, the suction opening 26 is formed by a non-circular ring element, which preferably includes a mounting section 25, being intended to support fixing the attachment 20 to the distal end section 11 of the handpiece 10, in particular in front of the suction aperture 15.

Preferably, it is provided that the handpiece 10, in particular the distal end section 11 of the handpiece 10, and the attachment 20 are configured to form a snap connection for establishing a reversible connection between the handpiece 10 and the attachment 20. For example, the attachment 20 is made from a material, being more flexible and/or elastic compared to the material of the distal end section 11 of the handpiece 10 such that the mounting section 25, in particular the ring shaped mounting section 25, can be pulled onto the distal end section 11 of the handpiece 10 having the suction aperture 15.

Especially, the mounting section 25 of the attachment 20 interacts with a collar section 14, which surrounds the suction aperture 15 of the distal end section 11 of the handpiece 10. Furthermore, the collar section 14 and the distal end section 11 of the handpiece 10 interact with the mounting section 25 in a form fitting and/or force fitting way in a direction being perpendicular to the plane P of the suction aperture 15.

Especially, the suction aperture 15 and the suction opening 26 have mainly the same shapes and sizes such that mounting the attachment 20 to the handpiece 10 does not reduce the cross section of an opening, being used for suctioning the material during the use of the suction device 1. Preferably, the attachment 20 includes a side wall 23 extending or protruding from the mounting section 25 of the attachment 20.

The side wall 23 of the attachment 20 is modulated in its lengths, being measured along a direction being perpendicular to the suction opening 26 or the plane P. In particular, the side wall 23 has at least one side wall section 21, which extends over a length L1 from the suction opening 26 at the mounting section 25. Especially, two side wall sections 21 are located on opposite sides of the suction opening 26 of the attachment 20 and form a working channel 30. The working channel 30 is dimensioned such that a high suction volume can be guaranteed and simultaneously the inner side of the side wall 23 can be used as splatter protection. Preferably, the suction device 1 having the attachment 20 is configured similar to a tooth brush for guaranteeing an optimal accessibility to all teeth, especially to the molars. Especially, the lengths L1 being assigned to the side wall section 21 represents a maximum length of the side wall 23 protruding from the mounting section 25 into a direction being substantially perpendicular to the plane P of the suction opening 26. The side wall 23 can extend perpendicular to the plan P of the suction opening 26 or slanted relative to a direction being perpendicular to the plan P of the suction opening 26.

Especially, the side wall sections 21, having the maximum lengths, are arranged in a mirror symmetric manner relative to an axis of the suction opening 26, the axis being the large axis or the first extension E1 of the cross section of the suction opening 26 and/or the axis mainly extending parallel to the longitudinal direction LD.

Moreover, it is preferably provided, that the maximum length L1 of the side wall section 21 is smaller than the maximum extension of the cross section of the suction opening 26 and/or the suction aperture 15 of the suction device 1. In particular, the length L1 is smaller than both the extension along the large axis, i.e. the first extensions E1, and the small axis, i.e. a second extension, of the oval cross section, being assigned to the suction opening 26. In other words, the side wall sections 21, protruding from the distal end section 1 of the handpiece 10 in the mounted state, are comparably small and support the additional use of a tool 2, which for example could be located between the treatment zone, i.e. the tooth, and the suction device 1 for suctioning material during the dental treatment. Especially, it turned out that said specific geometry allows an effective removing of material and hinders splashes, which are generated during the treatment, in particular during a treatment of a tooth by a scaler and/or a powder jet device, from exiting the treatment zone TZ or the mouth of the patient.

In particular, the suction device 1 has a thickness D at the distal end section 11 including the suction aperture 15 of less than 25 mm, preferably less than 20 mm and most preferably less than 18 mm. Furthermore, a maximum length L1 of the side wall 23 is preferably between 3 and 20 mm, preferably between 8 and 14 mm and most preferably about 12 mm.

Figure 3:
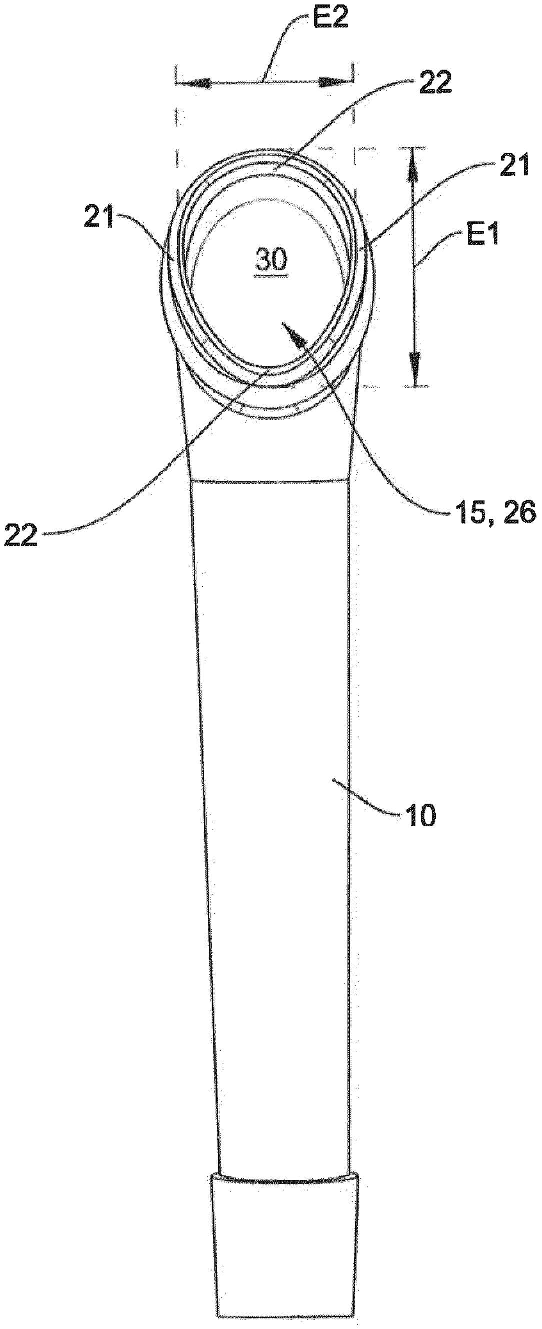

In FIG. 3 another side view of the suction device 1 for suctioning material during dental treatment according to the preferred embodiment is illustrated. Actually, the side view includes a top view on the suction aperture 15 and the suction opening 26, having preferably a first extension E1 and a second extension E2, the first extension E1, being the maximum extension along the longitudinal direction LD of the handpiece 10, while the second extension E2, being the maximum extension of the suction aperture 15 and/or suction opening 26 extending along a direction, being perpendicular to the first extension E1 and the longitudinal direction LD of the handpiece 10.

Figure 4:
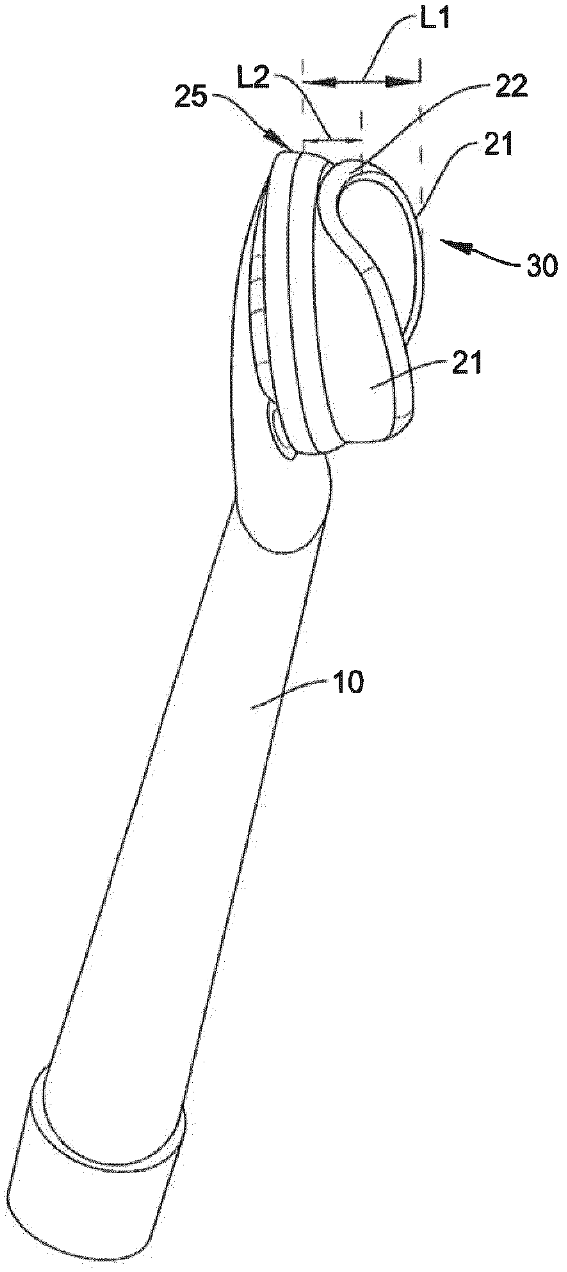

In FIG. 4 the suction device 1 for suctioning material during dental treatment is illustrated schematically in a perspective view. This perspective view shows that the side wall 23 is modulated regarding its lengths L1 and in particular includes further side wall sections 22 being located opposite to each other, in particular opposite to each other along a direction, which mainly extends perpendicular to the longitudinal direction LD of the handpiece 10. The further wall sections 22 has a further length L2, being smaller than the length L1 of the side wall section 21 such that the suction device 1 for suctioning the material can be located above or below the treatment zone TZ such that the side wall sections 21, including the maximum length L1, extends mainly parallel to the arrangement of the teeth in the mouth of the patient. Furthermore, the reduced further length L2 of the further side wall section 22 allows simultaneously to place the nozzle head and/or another tool 2 between the suction device 1 and the teeth.

Furthermore, the length L1 of the side wall 23, protruding from the mounting section 25 changes continuously from the side wall section 21 to the further side walls section 22, in particular without sharp modifications in its course for avoiding any hurts of the patient during the treatment.

Figure 5:
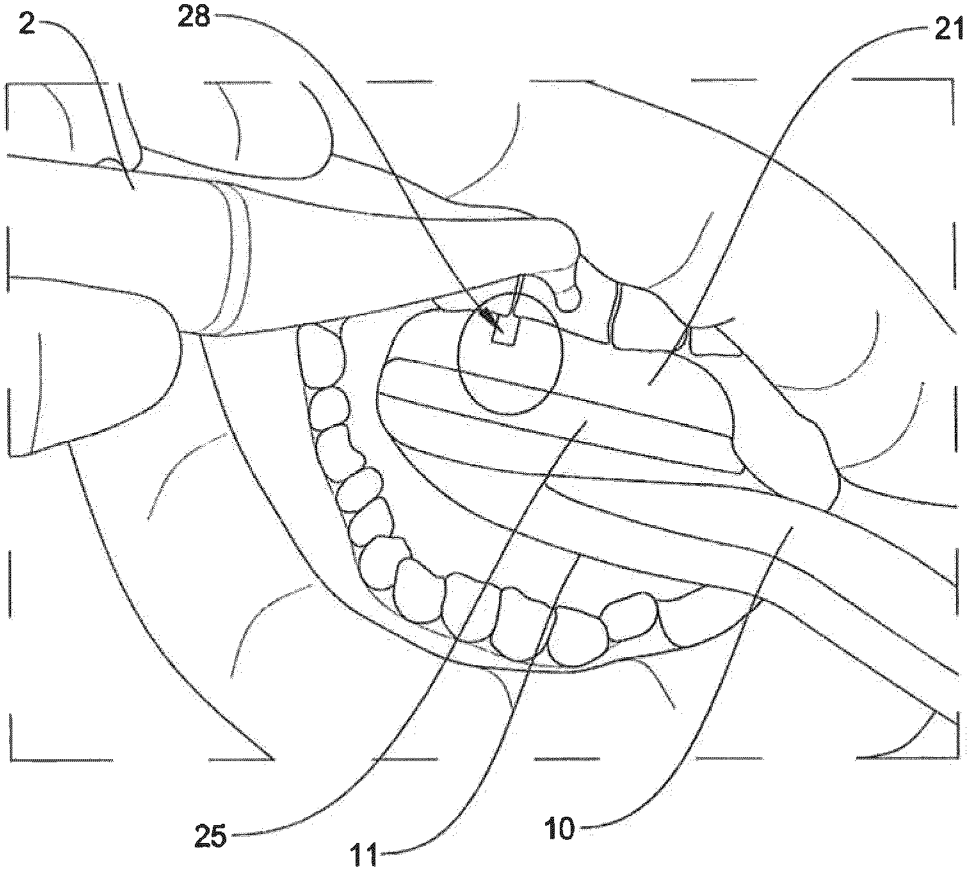
FIG. 5 illustrates the suction device of FIG. 1 in another use situation.

In FIG. 5 a suction device 1 for suctioning material during the dental treatment is shown according to a second preferred embodiment during a treatment. In particular, the suction device 1 of FIG. 5 corresponds to the suction device 1 illustrated in the FIG. 1 to 4 and in addition includes an interruption in form of a slit 28 in the side wall section 21, being preferably located in the side wall section 21 at its maximum length L1. Such a slit 28 prevents the aspirating suction device 1 from being sucked to the teeth and/or mouth. Alternatively, it is also conceivable that the interruption is formed by holes in the side wall section 21.

Figure 6:
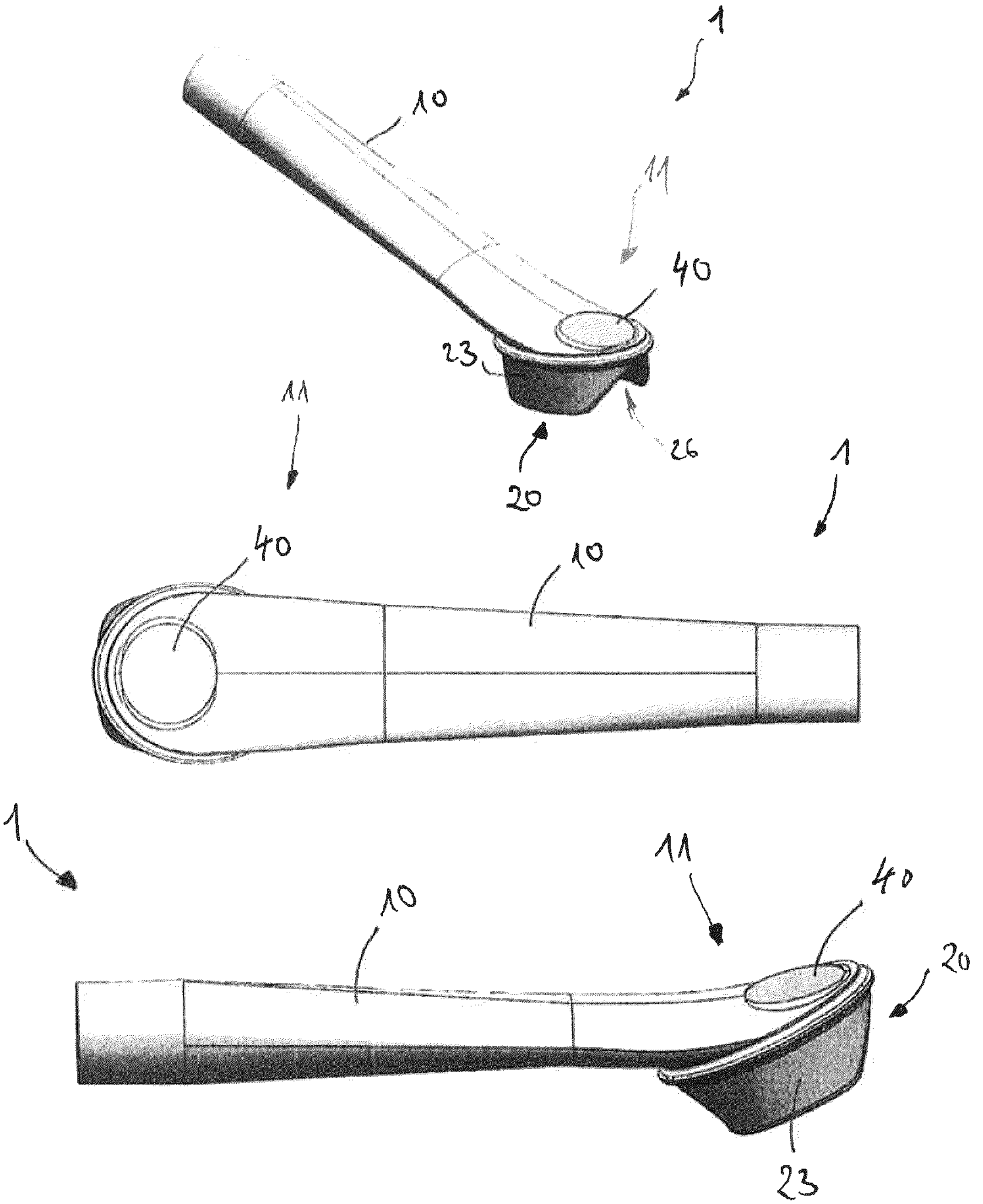
FIG. 6 illustrates schematically a suction device according to another embodiment of the present disclosure, FIG. 7 Illustrates schematically a suction device according to another further embodiment and FIGS. 8*a* and *b* illustrates simulations for suction effects.

In FIG. 6 a suction device 1 according to another preferred embodiment is shown in three different perspectives. In addition to the features of the previous embodiment, the embodiment of FIG. 6 includes a mirror element 40, being arranged at the back of the handpiece 1. The mirror element 40 is particularly arranged at the side facing away from the suction opening 26 or the attachment 20 and can be used, for example, by the operator after finishing the sucking process by just turning around the suction device 1, in particular the handpiece 10. Preferably, the cross section area of the mirror element 40 is smaller than the cross section area of the suction opening 26, both measured in a direction parallel to the extension of the suction opening 26. For example, a ratio of the cross section area of the mirror element 40 to the cross section area of the suction opening 26 is smaller than 0.6, more preferably smaller than 0.4 and most preferably smaller than 0.35. The mirror element 40 can be flat or curved, for example for creating a magnifying effect by imaging.

Figure 7:
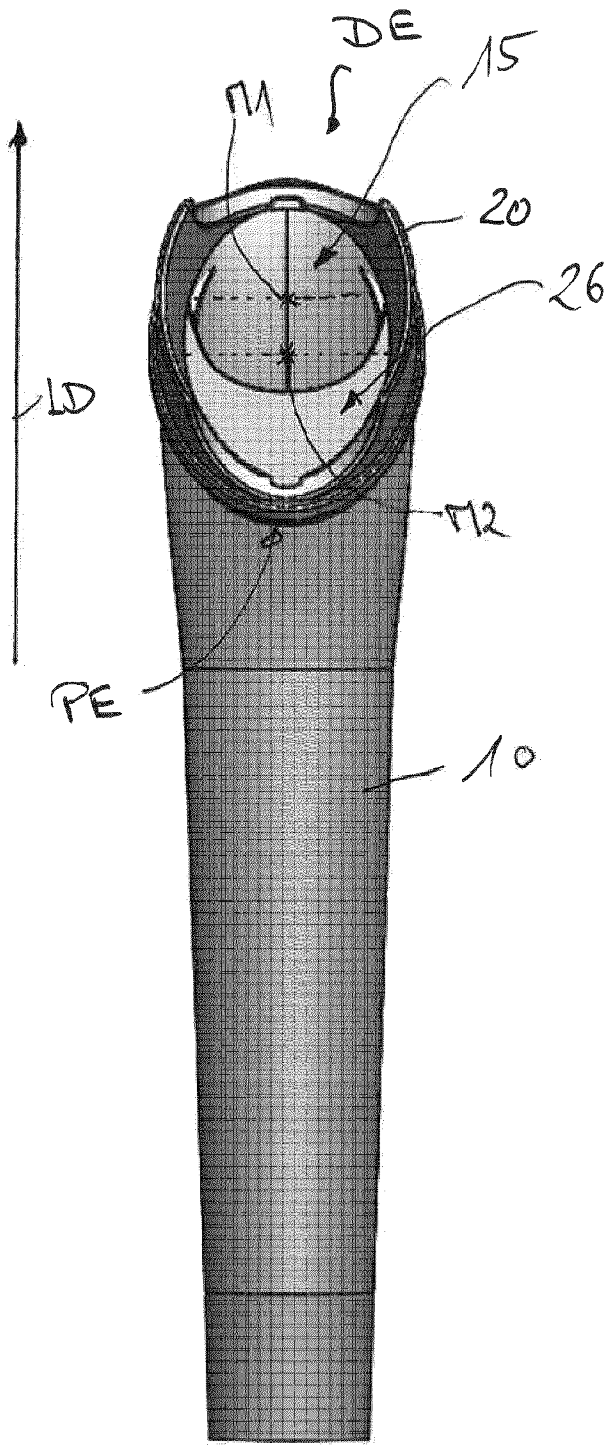

In FIG. 7 another further embodiment of the suction device 1 according to the present disclosure is illustrated. In particular, the suction device 1, being shown in FIG. 7, mainly corresponds to the suction devices 1 being presented in FIGS. 1 to 7. In particular, the embodiment of FIG. 7 addresses a suction device 1 having a suction aperture 15 of the handpiece 10, being different from the suction opening 26 of the attachment 20. Particularly, the handpiece 10 and the attachment 20 are configured such that the suction aperture 15 distinguishes from the suction opening 26 of the attachment 20. In particular, in the embodiment of FIG. 7 the suction aperture 15 of the handpiece 10 is smaller compared to the suction opening 26 of the attachment 20. In particular, a distal end DE of the hand piece 10 is formed such that a section of the tube formed by the handpiece 10 in the distal end DE section 11 of the handpiece 10 covers, at least partially, the suction opening 26 of the attachment 20. In other words: A side wall of the tube extends into the region of the suction opening 26 for covering the suction opening 26, in particular at a distal end DE of the attachment 20/suction opening 26. Preferably, the suction aperture 15 has a first cross section extending in the plane P and the suction opening 26 has a second cross section extending in the plane P. Preferably, a ratio of the first cross section to the second cross section has a value being smaller than 0.8 preferably smaller than 0.75 and most preferably smaller than 0.65.

Preferably, the ratio of the first cross section to the second cross section is between 0.3 and 0.9, more preferably between 0.4 and 0.8 and most preferably between 0.5 and 0.75.

Furthermore, a first center M1 can be assigned to the first cross section of the suction aperture 15 and a second center M2 can be assigned to the second cross section of the suction opening 26. Preferably, the first center M1 is arranged offset to the second center M2, in particular along a direction being parallel to the longitudinal direction LD of the handpiece 10, in particular its tube. In particular, the first center M1 is located closer to the distal end DE of the suction device 1, compared to the second center M2 being closer to a proximal end PE of the attachment 20. This off-set arrangement, in particular towards the distal end DE of the suction device 1 allows a more homogenous suction in operation and even allows to remove particles or materials from a bottom of the mouth (in the region of the last molar), which is usually not easy to access. Preferably, the first center M1 and the second center M2 are shifted about at least 1 mm, more preferably about at least 3 mm and most preferably at last about more than 8 mm.

Furthermore, it is conceivable that the shape of the suction opening 26 and the shape of the suction aperture 15 distinguish from each other. While the suction opening 26 might be elliptical, the suction aperture 15 might have a shape being different from a pure elliptical geometry.

Figure 8A:
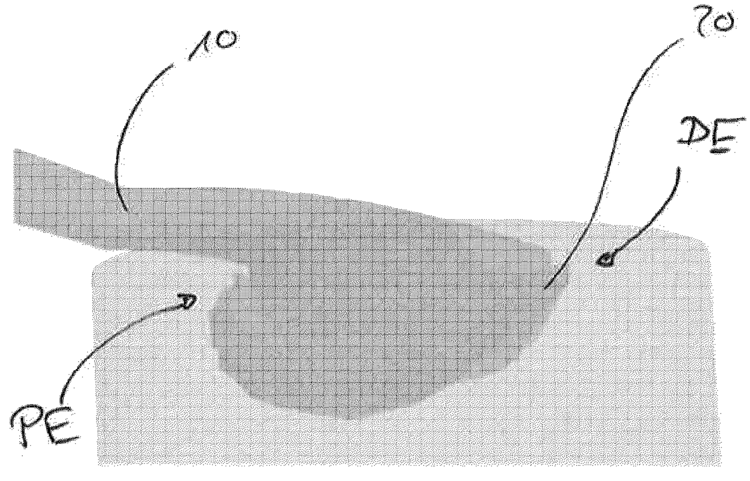
Figure 8B:
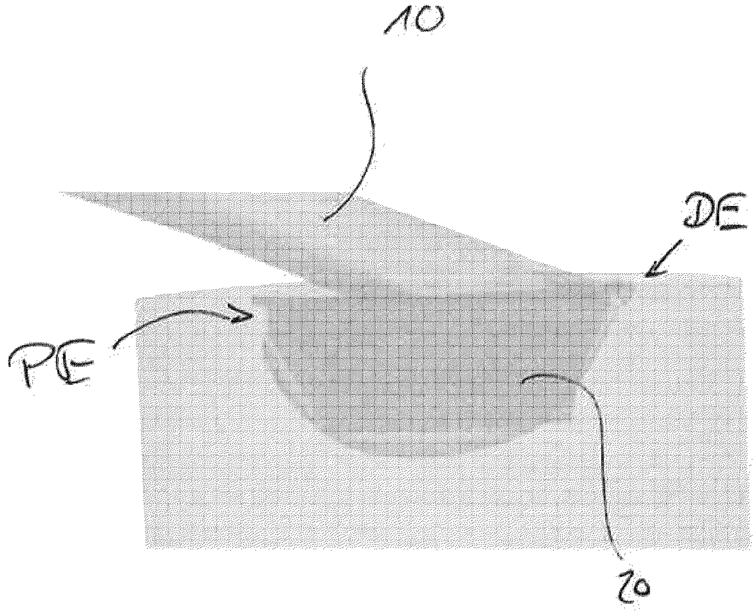

FIGS. 8*a* and 8*b* show simulations, which illustrate the suction effect of the suction device 1, in particular of the embodiment of FIG. 7. FIG. 8*a* illustrates a suction device 1 having a suction opening 26 and a suction aperture 15, being similar to each other. FIG. 8*b* shows a suction simulation for the suction device 1 of FIG. 7. As illustrated, the suction effect is distributed in a much more homogenous way in the example of FIG. 8*b*, in particular along the longitudinal direction LD, while the maximum suction effect in FIG. 8*a* is localized at the proximal end PE of the attachment 20 of the suction device 1 in FIG. 8*a*. As a result, the off-set arrangement and the different sizes of suction opening 26 and suction aperture 15 of the embodiment of FIG. 7 allow an optimization of the suction effect of the suction device 1.

The invention claimed is:

1. A suction device for suctioning material during a dental treatment, the suction device comprising a handpiece having a suction aperture to allow passage of suctioned material, an attachment for splatter protection designed for being mounted on the handpiece, the attachment comprising:

a mounting section for an exchangeable or a permanent mounting of the attachment to the handpiece, a suction opening for the passage of suctioned material through the suction opening and the suction aperture when the attachment is mounted on the handpiece, and at least a side wall extending from the suction opening and forming a working channel designed to surround a molar partially or at least two sides of the molar, and simultaneously to host a dental tool, the channel having at least one introduction section for introduction of a dental tool into the working channel, characterized in that the working channel extends along a direction being mainly slanted by up to 45° relative to the longitudinal direction of the handpiece, wherein the suction opening is non-circular.

2. The suction device according to claim 1, wherein the working channel is formed by two wall sections of the side wall the side wall sections being arranged opposite to each other and the wall sections having the same length, measured in a direction perpendicular to a plane of the suction opening.

3. The suction device according to claim 2, wherein the attachment comprises the side wall sections, being arranged opposite to each other and extending from the suction opening over the length, and a further side wall sections, the further side wall sections, being arranged opposite to each other and extending from the suction opening over a further length, wherein for forming the introduction section a ratio between a mean of the minimum further lengths to a mean of maximum lengths is between 0 and 0.8.

4. The suction device according to claim 1, wherein the working channel extends along a direction being mainly parallel to a longitudinal direction of the handpiece or along a direction being mainly slanted by up to 45° relative to the longitudinal direction of the handpiece.

5. The suction device according to claim 1, wherein along a circumferential direction of the suction opening the length of the side wall is modulated.

6. The suction device according to claim 1, wherein the attachment includes an interruption, in comprising a slit and/or a hole in the side wall section.

7. The suction device according to claim 1, wherein the attachment is made from a flexible and/or soft material.

8. The suction device according to claim 1, wherein the maximum length of the side wall is between 3 and 20 mm.

9. The suction device according to claim 1, wherein the suction aperture extends in a plane, which is slanted relative to a reference plane being perpendicular to a longitudinal direction of the handpiece about a first angle between 70° and 90°.

10. The suction device according to claim 1, wherein the suction opening of the attachment is different from the suction aperture of the handpiece regarding size and/or position.

11. The suction device according to claim 1, wherein an extension of the suction aperture and/or suction opening is between 10 mm and 50 mm.

12. The suction device according to claim 1, wherein the suction device includes a mirror element, being arranged on a side being opposite to the suction opening.

* * * * *